(12) United States Patent
Morihashi et al.

(10) Patent No.: US 11,285,576 B2
(45) Date of Patent: Mar. 29, 2022

(54) SERVO CONTROLLER

(71) Applicant: FANUC CORPORATION, Yamanashi (JP)

(72) Inventors: Ryou Morihashi, Yamanashi (JP); Kenta Yamamoto, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 251 days.

(21) Appl. No.: 16/829,270

(22) Filed: Mar. 25, 2020

(65) Prior Publication Data

US 2020/0306916 A1  Oct. 1, 2020

(30) Foreign Application Priority Data

Mar. 28, 2019  (JP) .............................. JP2019-063998

(51) Int. Cl.
  *B23Q 15/12*  (2006.01)
  *G05B 19/404*  (2006.01)
  *B23Q 15/22*  (2006.01)
  *B23Q 17/22*  (2006.01)

(52) U.S. Cl.
  CPC ......... *B23Q 17/2233* (2013.01); *B23Q 15/12* (2013.01); *B23Q 15/22* (2013.01); *G05B 19/404* (2013.01)

(58) Field of Classification Search
  None
  See application file for complete search history.

(56) References Cited

U.S. PATENT DOCUMENTS

| 2020/0306915 A1* | 10/2020 | Morihashi | .......... | B23Q 17/2233 |
| 2020/0406416 A1* | 12/2020 | Morihashi | .............. | B23Q 15/08 |
| 2021/0181718 A1* | 6/2021 | Morihashi | .......... | G05B 19/4166 |

FOREIGN PATENT DOCUMENTS

| JP | 2000-267732 A | 9/2000 |
| JP | 2006-172149 A | 6/2006 |
| JP | 2011-167817 A | 9/2011 |
| JP | 5606658 B1 | 10/2014 |
| JP | 6416218 B2 | 10/2018 |
| JP | 2019-028597 A | 2/2019 |

OTHER PUBLICATIONS

An Office Action; "Notice of Reasons for Refusal", mailed by the Japanese Patent Office dated Jun. 29, 2021, which corresponds to Japanese Patent Application No. 2019-063998 and is related to U.S. Appl. No. 16/829,270; with English language translation.

\* cited by examiner

*Primary Examiner* — Ryan A Jarrett

(74) *Attorney, Agent, or Firm* — Studebaker & Brackett PC

(57) ABSTRACT

Provided is a servo controller that can prevent an unnecessary cut from being generated during oscillation machining. A servo controller which controls a machine tool 10 that turns a workpiece W by cooperative operation of a plurality of axes includes: an oscillation command generating unit 23 that generates an oscillation command for causing the workpiece W and the tool 11 to relatively oscillate; a deviation deducting unit 31, 241 that applies the oscillation command to a position deviation based on a moving command for causing the workpiece W and the tool 11 to relatively move, and deducts a steady-state position deviation; and a learning control unit 27 that calculates a compensation amount from a position deviation based on the moving command after deducting the steady-state position deviation.

2 Claims, 4 Drawing Sheets

SERVO CONTROLLER

This application is based on and claims the benefit of priority from Japanese Patent Application No. 2019-063998, filed on 28 Mar. 2019, the content of which is incorporated herein by reference.

BACKGROUND OF THE INVENTION

Field of the Invention

The present invention relates to a servo controller.

Related Art

Conventionally, oscillation machining has been known which shreds chips by causing a tool and a workpiece to relatively oscillate in the machining direction (oscillating operation) (e.g., see Japanese Patent No. 6416218 and Japanese Patent No. 5606658). Japanese Patent No. 6416218 discloses that "in the cutting tool 130, the machined portion upon moving forward and the machined portion upon moving backward partially overlap with each other, and the cut portion in the $n+1^{th}$ rotation of the peripheral surface of the workpiece W includes the portion that has already been cut in the $n^{th}$ rotation. In this portion, so-called idle operation in which the cutting tool 130 does not cut the workpiece W, and thus performs idle cutting during cutting occurs. The chips generated from the workpiece W during machining are shredded by the idle operation. The machine tool 10 can smoothly perform machining of the outer shape of the workpiece W while shredding the chips by the cutting tool 130 moving forward and backward along the cutting feed direction".

Furthermore, Japanese Patent No. 5606658 also discloses that "it is configured such that a command for performing oscillation cutting which defines the frequency of oscillation and the amplitude to be applied along the moving path during machining is provided in the machining program, a compensation path which is a trajectory of a reference position of a tool 62 with respect to the machining target is generated on the basis of the compensation information from the program path based on a moving command in the machining program, whereby oscillation along the compensation path is applied to the machining in this compensation path. With such a configuration, it is possible to cut positions other than the compensation path, or possible to prevent the machining target from being cut excessively. At this time, it is further possible to finely shred, by the oscillation, the chips to be generated during cutting by setting the oscillation along the compensation path to have the amplitude of several hundred micrometers or less and the frequency of a low frequency oscillation of several hundred Hz or less".

Patent Document 1: Japanese Patent No. 6416218 Patent Document. 2: Japanese Patent. No. 5606658

SUMMARY OF THE INVENTION

It is desirable to prevent an unnecessary cut from being generated during oscillation machining.

It is an object of the present invention to provide a servo controller that can prevent an unnecessary cut from being generated during oscillation machining.

(1) According to an aspect of the invention, a servo controller which controls a machine tool that turns a workpiece by cooperative operation of a plurality of axes includes: an oscillation command generating unit that generates an oscillation command for causing the workpiece and the tool to relatively oscillate; a deviation deducting unit that applies the oscillation command to a position deviation based on a moving command for causing the workpiece and the tool to relatively move, and deducts a steady-state position deviation; and a learning control unit that calculates a compensation amount from a position deviation based on the moving command after deducting the steady-state position deviation.

According to the present invention, it is possible to provide a servo controller that can prevent an unnecessary cut from being generated during oscillation machining.

DETAILED DESCRIPTION OF THE INVENTION

In the following, an example of an embodiment of the present invention will be described with reference to the attached drawings. It should be noted that the same reference symbols will be attached to identical or corresponding portions in the respective drawings.

Figure 1:
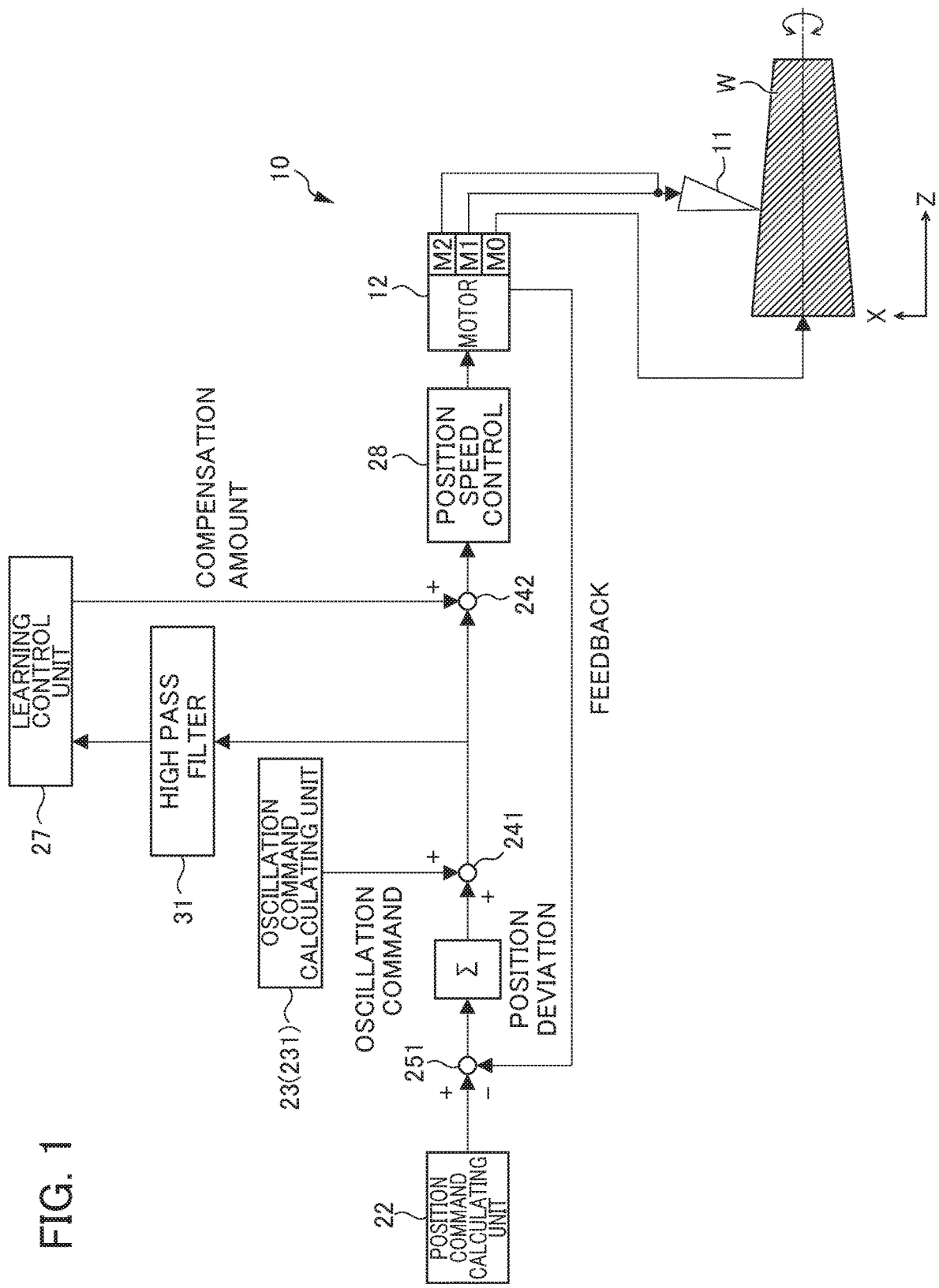
FIG. 1 is a diagram showing the configuration of a machining system including a servo controller of a machine tool according to the present embodiment.

FIG. 1 is a diagram showing the configuration of a machining system 1 including a servo controller of a machine tool 10. The machining system 1 shown in FIG. 1 includes a machine tool 10 and a servo controller for controlling the machine tool 10.

The machine tool 10 includes a tool 11. The tool 11 turns a workpiece W having, for example, a cylindrical, columnar, conical, or frustoconical shape. In the example of FIG. 1, the tool 11 turns the outer peripheral surface of the workpiece W. In the example of FIG. 1, the center axis line of the workpiece W serving as the rotation axis of the workpiece W is shown as the Z-axis, and the axis line perpendicular to the Z-axis is shown as the X-axis.

The shape in the direction along the Z-axis in which the machine tool 10 machines is not limited to a linear one, and the machine tool 10 is also able to machine the workpiece W having an arc shape. Furthermore, the machine tool 10 is not limited to machining the outer peripheral surface of the workpiece W, and it is also possible to machine the inner peripheral surface of the workpiece W such as a cylindrical shape. Furthermore, the machine tool 10 is not limited to turning, and it is also possible to perform machining such as cutting, lapping, grinding, or polishing.

The machine tool 10 includes a spindle M0 as a motor 12, and two feed axes M1 and M2 that cooperate with the spindle M0. The spindle M0 includes a spindle motor, and the feed shafts M1 and M2 include servo motors. The spindle M0 and the feed axes M1 and M2 are controlled by the servo controller.

The spindle M0 causes the workpiece W to rotate around the center axis line (the Z-axis) of the workpiece W. The feed axis M1 is able to perform both feeding of the tool 11 in the Z-axis direction (the first direction) and a reciprocating motion (i.e., oscillation) of the tool 11 in the Z-axis direction. The feed axis M2 is able to perform both feeding of the tool 11 in the X-axis direction (the second direction) and the reciprocating motion (i.e., oscillation) of the tool 11 in the X-axis direction.

When turning a cylindrical or columnar workpiece W, the workpiece W is made to rotate around the center axis line (the Z-axis) of the workpiece W, and the tool 11 is fed only in the Z-axis direction (the machining direction in this case) along the generating line of the outer peripheral surface of the workpiece W.

On the other hand, when turning the workpiece W having a different outside diameter in the Z-axis direction such as the workpiece W having a tapered shape or an arc shape, the workpiece W is made to rotate around the center axis line (the Z-axis) around the workpiece W, and the tool 11 is fed in an oblique direction along the generating line of the outer peripheral surface of the workpiece W (the composite direction of the Z-axis direction and the X-axis direction) (the machining direction in this case). In this case, in order to feed the tool 11 in an oblique direction along the generating line of the outer peripheral surface of the workpiece W, at least two feed axes M1 and M2 are required. By controlling both the feed axis M1 and the feed axis M2, the tool 11 is fed in the oblique direction along the generating line of the outer peripheral surface of the workplace W.

The servo controller is configured by a computer including memory such as ROM (read only memory) and RAM (random access memory), a CPU (central processing unit), and a communication control unit, which are connected to each other via a bus. Furthermore, the servo controller includes a position command calculating unit 22, an oscillation command generating unit 23 (including an oscillation amplitude calculation part, an oscillation frequency calculation part (not shown), and an oscillation command calculating unit 231 of FIG. 2 to be described later), a control unit (including adders 241 and 242, a subtractor 251, a learning control unit 27, and a position speed control unit 28 in FIG. 1 to be described later), a high pass filter 31 that constitutes a deviation deducting unit, and an unillustrated storage unit, and the function or the operation of each component may be achieved with the cooperation between the CPU and the memory mounted on the computer, and the control program stored in the memory.

For example, machining conditions of the workpiece W are stored in the storage unit (not shown). The machining conditions of the workpiece W include, for example, the relative rotational speed of the workpiece W and the tool 11 around the center axis of the workpiece W, the relative feedrate of the tool 11 and the workpiece W, and the position command of the feed axes M1 and M2, etc.

A host computer (not shown) such as a CNC (Computer Numerical Controller), PLC (Programmable Logic Controller), etc. is connected to the servo controller, and the aforementioned rotational speed and feedrate may be inputted from the host computer to the storage unit (not shown). Furthermore, the storage unit (not shown) or the position command calculating unit 22 is not necessarily provided in the servo controller, and thus may be provided in the abovementioned host computer.

Furthermore, the storage unit (not shown) stores a machining program to be executed by the machine tool 10, and it may be configured such that the CPU (not shown) in the servo controller reads, as the machining conditions, the abovementioned rotational speed and the feedrate from the machining program, and outputs them to the position command calculating unit 22 and the oscillation command generating unit 23.

The position command calculating unit 22 creates a position command for causing the workpiece W and the tool 11 to move relatively. More specifically, the position command calculating unit 22 serves to create the position command of the feed axes M1 and M2 on the basis of the relative rotational speed of the workpiece W and the tool 11 around the center axis line of the workpiece W, and the relative feedrate of the tool 11 and the workpiece W. This position command is a command to instruct a target position when relatively feeding the tool 11 and the workpiece W in a direction along the generating line of the outer peripheral surface of the workpiece W (the machining direction).

The oscillation command generating unit 23 uses a position command from the position command calculating unit 22 to generate an oscillation command to cause the workpiece W and the tool 11 to relatively oscillate. More specifically, the oscillation command generating unit 23 creates an oscillation command of the feed axis M1 so as to, on the basis of the abovementioned rotational speed and the abovementioned feedrate, become an oscillation frequency of a positive non-integral multiple with respect to the rotational speed, and so that the tool 11 intermittently cuts the workpiece W. The oscillation command is a periodic command which is created so as to be asynchronous with respect to the rotational speed around the center axis described above, and includes the oscillation frequency and the oscillation amplitude. That is, the running state of the oscillating operation is represented by the oscillation frequency or the oscillation amplitude. The value by the term of S/60×I in Equation (1) of the oscillation command to be described later corresponds to the oscillation. frequency, the value by the term of K×F/2 in Equation (1) corresponds to the oscillation amplitude.

Herein, intermittent cutting indicates that the tool 11 turns the workpiece W while the tool 11 comes into contact with and separates from the workpiece W periodically, and is also referred to as oscillation cutting or vibration cutting. Furthermore, in FIG. 1, although the workpiece W rotates and the tool 11 oscillates with respect to the workpiece W, it may be configured such that the tool 11 rotates around the center axis line of the workpiece W, and the workpiece W oscillates with respect to the tool 11. Furthermore, in FIG. 1, although both the feed operation and the oscillating operation of the workpiece W are performed by one feed axis M1, M2, it may be configured so as to perform the feed operation and the oscillating operation of the workpiece W by different feed axes, respectively.

Figure 2:
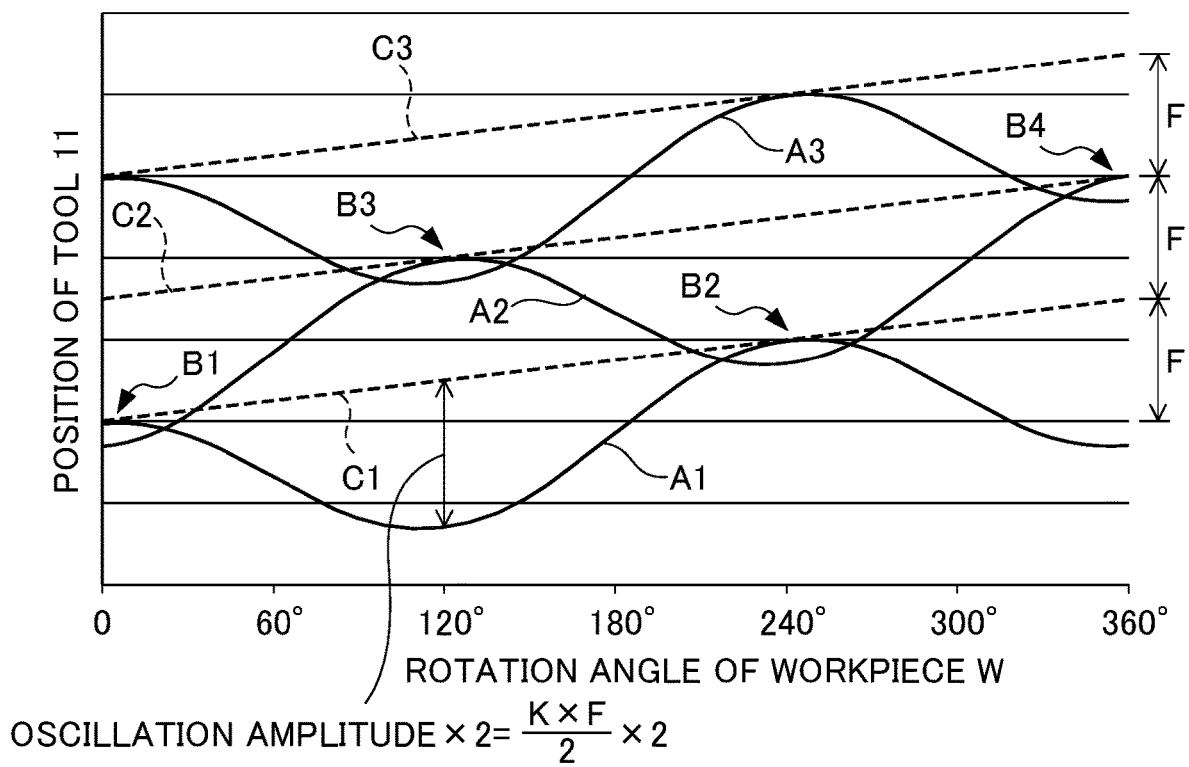
FIG. 2 is a diagram showing the relationship between a feed amount and a rotation angle in oscillating operation.

Hereinafter, a detailed description will be given of the oscillation command generating unit 23. FIG. 2 is a diagram showing the relationship between a feed amount and a rotation angle. The horizontal axis in FIG. 2 shows the rotation angle of the workpiece W, and the vertical axis shows the feed amount of the tool 11 in the machining direction (i.e., the direction along the generating line of the outer peripheral surface of the workpiece W in FIG. 1). A plurality of linear broken lines C1, C2, C3 . . . extending in the diagonal direction is shown in FIG. 2. As can be understood from FIG. 2, the vertical axis coordinate of the intersection point between the broken line C1 and the vertical axis corresponds to the vertical axis coordinate at the starting point of the next broken line C2. Similarly, the vertical axis coordinate of the intersection point between the broken line C2 and the vertical axis corresponds to the vertical axis coordinate at the starting point of the next broken line C3. The plurality of linear broken lines C1, C2, C3 . . . shows the trajectory of the tool 11 in the workpiece W in the case of no oscillation command. On the other hand, the curves A1, A2, A3, . . . shown in FIG. 2 show the trajectory of the tool 11 on the workpiece W in the case of the oscillation command. That is, the broken lines C1, C2, C3, etc. show only the position command before the oscillation command is added (the original command value), and the curves A1, A2, A3, etc. indicate the position command after the oscillation command is added. Therefore, the curves A1, A2, and A3 show a command obtained by adding a cosine-shaped oscillation command to each position command represented by the broken lines C1, C2, and C3.

Furthermore, the curve A1 is the trajectory of the tool 11 in the first rotation of the workpiece W, the curve A2 is the trajectory of the tool 11 in the second rotation of the workpiece W, and the curve A3 is the trajectory of the tool 11 in the third rotation of the workpiece W. For the purpose of simplicity, the trajectory of the tool 11 after the fourth rotation of the workpiece W is not shown.

The oscillation command generating unit 23 calculates the oscillation command in the following manner. In order to calculate a command such as the curves A1, A2, and A3 with each of the broken lines C1, C2, and C3, which are the position commands of the feed axes M1 and M2 calculated by the position command calculating unit 22 as a reference axis line, the oscillation command generating unit 23 determines the oscillation frequency. S/60×I in Equation (1) to be described later becomes the oscillation frequency.

In a case of determining the abovementioned oscillation frequency, as shown in FIG. 2, it is preferable that the initial phase of the cosine-shaped curve A2 with a certain broken line, for example, the broken line C2 as a reference axis, is shifted by a half Cycle with respect to the cosine-shaped curve A1 with one previous broken line, for example, the broken line C1 as a reference axis. The reason is that, in the case of being shifted by a half cycle, the oscillation amplitude of the oscillation command can be minimized, as a result of which, it is possible to shred the chips most efficiently.

In order to calculate a command such as the curves A1, A2, and A3 with each of the broken lines C1, C2, and C3 as a reference axis line, the oscillation command generating unit 23 determines the oscillation amplitude of the oscillation command described above. The value according to the term K×F/2 in Equation (1) to be described later becomes the oscillation amplitude. The curve A1 and the curve A2 shown in FIG. 2 overlap with each other at the location B1 where the rotation. angle is about 0 degrees and at the location B2 where the rotation angle is about 240 degrees. As can be seen from FIG. 2, at the locations B1 and B2, the maximum value of the curve A1 with respect to the broken line C1 is larger than the minimum value of the curve A2 with respect to the broken line C2. In other words, it is desirable for the oscillation command generating unit 23 to determine the oscillation amplitude so that the previous curve A1 and the subsequent curve A2 partially overlap with each other. It should be noted that, since the feedrate is constant in the curves A1, A2, and A3, the oscillation amplitudes of each oscillation command are all the same.

In this overlapping locations B1 and B2, since the tool 11 is spaced from the workpiece W while machining in the trajectory of the curve A2, the workpiece W is not machined. In the present embodiment, since such overlapping portions B1 and B2 are generated periodically, it is possible to perform so-called intermittent cutting. In the example shown in FIG. 2, the chips are generated at the locations B1 and B2, respectively by the operation according to the curve A2. In other words, two chips are generated in the curve A2 in the second rotation. Since such intermittent cutting is performed periodically, it is possible to perform vibration cutting periodically.

Furthermore, the curve A3 formed with respect to the broken line C3 is the same shape as the curve A1. The curve A2 and the curve A3 overlap with each other at the location B3 where the rotation angle is about 120 degrees and at the location B4 where the rotation angle is about 360 degrees. The chips are generated at the locations B3 and B4 respectively by the operation according to the curve A3. In other words, two chips are generated in the curve A3 in the third rotation. Thereafter, two chips are generated every one rotation of the workpiece. However, chips are not generated in the first rotation.

By defining the oscillation frequency and the oscillation amplitude in this way, the oscillation command generating unit 23 in the control unit 26 calculates the oscillation command. For example, the oscillation command is expressed as shown in Equation (1) below.

[Math. 1]

$$\text{OSCILLATION COMMAND} = \frac{K \times F}{2} \cos\left(2\pi \times \frac{S}{60} \times I \times t\right) - \frac{K \times F}{2} \quad (1)$$

In Equation (1), K is as oscillation amplitude multiplying factor, F is a moving amount of the tool 11 per rotation of the workpiece W, that is, the feed amount per rotation [mm/rev], S is a rotation speed around the center axis of the workpiece W [min-1], or [rpm], and I is an oscillation frequency multiplying factor. Here, the abovementioned oscillation frequency corresponds to the term of S/60×I in Equation (1), and the abovementioned oscillation amplitude corresponds to the term of K×F/2 in Equation. (1). However, the oscillation amplitude multiplying factor K is a number of 1 or more, and the oscillation frequency multiplying factor I is a non-integer greater than zero (for example, a positive non-integer such as 0.5, 0.8, 1.2, 1.5, 1.9, 2.3, or 2.5). The oscillation amplitude multiplying factor K and the oscillation frequency multiplying factor I are constants (in the example of FIG. 2, I is 1.5). The reason why the oscillation frequency multiplying factor I is not an integer is, is a case of the oscillation frequency becoming exactly the same as the rotation speed around the center axis of the workpiece W, it is not possible to generate the overlapping locations B1, B2, B3, B4, etc. described above, and thus, the shredding effect of the chips owing to the oscillation cutting cannot be obtained.

Furthermore, according to Equation (1), the oscillation command is a command in which the term (K×F/2) is subtracted as an offset value with respect to a cosine wave with each of the broken lines C1, C2, and C3 indicating the position command as a reference axis line. Therefore, it is possible to control the position trajectory of the tool 11 based on the composite command value obtained by adding the oscillation command to the position command, with the position according to the positon command in the machining direction of the tool 11 as an upper limit. Therefore, the curves A1, A2, A3 and the like in FIG. 2 do not exceed the broken lines C1, C2, C3 and the like in the+direction. (i.e., the machining direction of the tool 11). Furthermore, by defining the oscillation command as represented by Equation (1), as can be seen from the curve A1 in FIG. 2, it is configured such that a large oscillation does not appear from the beginning in the feed direction of the tool 11 at the machining starting point (the position of 0 degrees of the horizontal axis). It should be noted that the initial values of the respective parameters (K and I in Equation (1)) which are adjusted when the oscillation frequency and the oscillation amplitude are determined are stored in a storage unit (not shown) before the operation of the machine tool 10. The rotation speed (S) of the workpiece W is stored in advance as a machining condition in the storage unit (not shown). The feed amount per rotation F is calculated from the rotation speed (S) and the position command created by the position command calculating unit 22.

For example, in a case in which the machined workplace has a cylindrical shape or a columnar shape, the oscillation is performed along the machining direction which is the direction of the feed axis M1 (Z-axis) along the generating line of the outer peripheral surface of the workpiece W. On the other hand, in a case in which the machined workpiece has a conical shape, a truncated cone shape (tapered shape), or an arc shape, the oscillation is performed along an oblique direction along the generating line of the outer peripheral surface of the workpiece W, i.e., along the machining direction which is a composite direction of the direction of the feed axis M1 (Z-axis) and the direction of the feed axis M2 (X-axis). The oscillation command calculating unit 231 of the oscillation command generating unit 23 calculates the oscillation command on the basis of the oscillation amplitude and oscillation frequency from Equation (1).

The control unit 26 has a function to calculate a torque command and control the feed axes M1 and M2 on the basis of a composite command (for example, a position command value) obtained by adding the aforementioned oscillation command to the position deviation which is the difference between the aforementioned position command and the actual positions of the feed axes M1 and M2. The actual positions of the feed axes M1 and M2 correspond to the position feedback value obtained by a position detecting unit such as encoders mounted on the feed axes M1 and M2 (not shown).

The control unit 26 includes the adders 241 and 242, the subtractor 251, the learning control unit 27, and the position speed control unit 28. The subtractor 251 obtains the position deviation which is the difference between a position command (moving command) calculated by the position command calculating unit 22 and a position feedback (an actual position) from the encoder in the feed axes M1 and M2. The adder 241 constitutes a deviation deducting unit, and adds the position deviation outputted from the subtractor 251 and obtained by integration and the oscillation command calculated by the oscillation command generating unit 23, thereby calculating a composite command. The high pass filter 31 constitutes the deviation deducting unit, allows the high frequency component of the composite command immediately after being outputted from the adder 241 to pass through, removing the low frequency component so as to remove the steady-state deviation included in the low-frequency component (steady-state position deviation), thereby creating the composite command.

The learning control unit 27 performs learning for one of the oscillations of the X-axis and the Z-axis directions in the oscillation of the tool 11. The learning control unit 27 inputs the composite command outputted from the high pass filter 31, and obtains the compensation amount of the composite command by performing the learning control so that the compensation amount of the composite command is reduced. The adder 242 adds the compensation amount obtained by the learning control unit 27 to the composite command immediately before being inputted to the position speed control unit 28.

The position speed control unit 28 performs position control, speed control and current control on the basis of the composite command compensated by the learning control unit 27, and drives and controls the servo motor in the feed axes M1 and M2.

Figure 4:
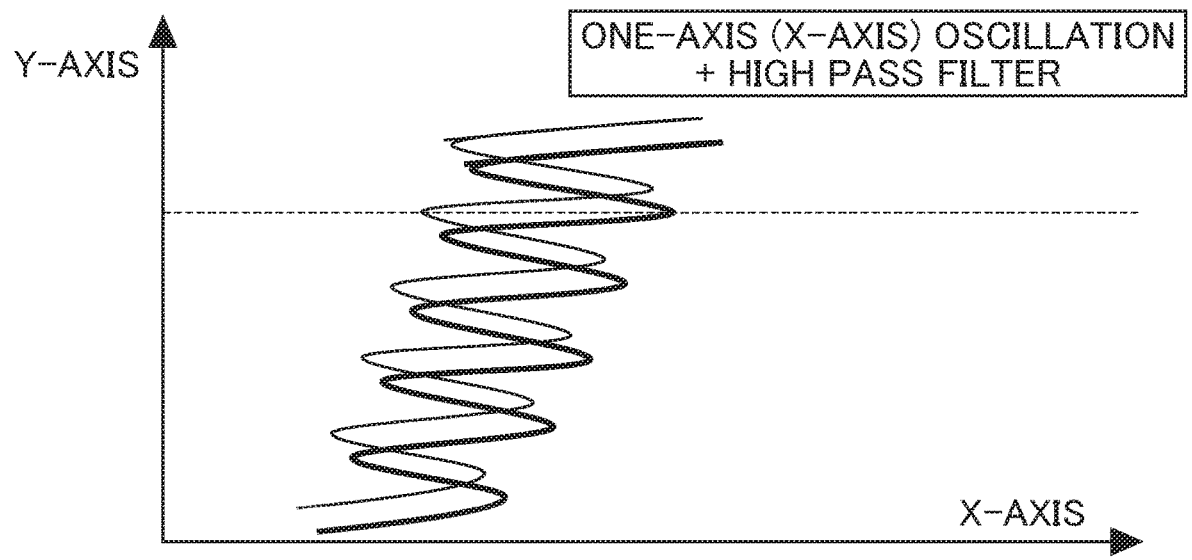
FIG. 4 is a graph showing operation of a tool after deducting steady-state deviation by the high pass filter in the oscillating operation.

In the machining system 1 according to the above configuration, as described above, by removing the low frequency component of the composite command immediately after being outputted from the adder 241 by means of the high pass filter 31, the steady-state deviation included in the low frequency component is removed. Therefore, as shown in FIG. 4, the actual position (the graph of the bold line) does not deviate significantly from the moving command (the graph of the thin line) in the X-axis direction which is the horizontal axis, and thus substantially coincides with the moving command. FIG. 4 is a graph showing the operation of the tool 11 after deducting the steady-state deviation by the high pass filter 31 in the oscillating operation.

Figure 3:
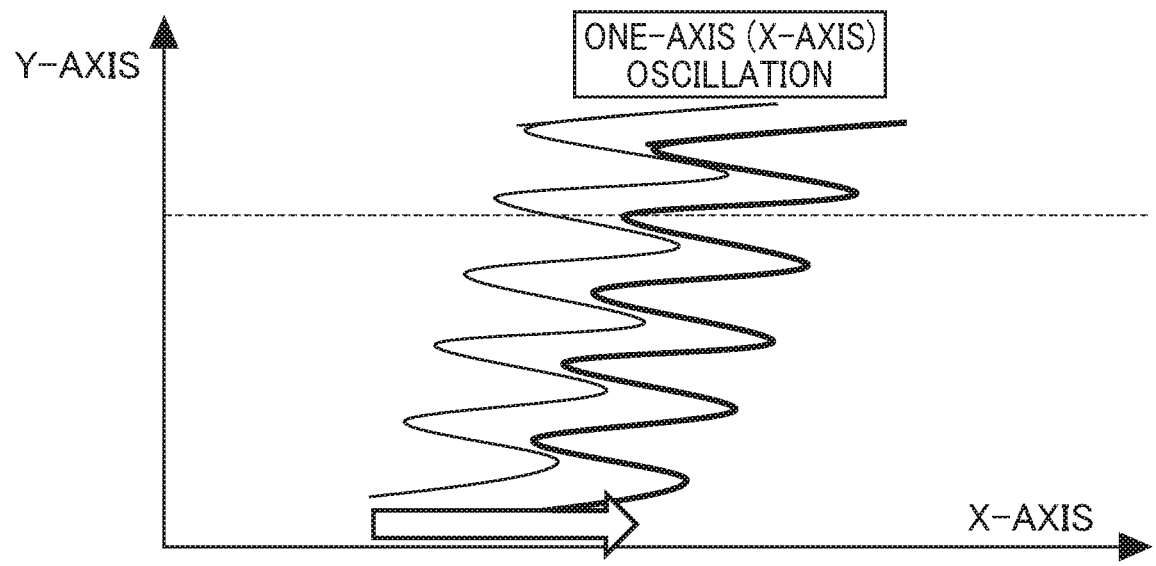
FIG. 3 is a graph showing operation of a tool in a case in which steady-state deviation is not deducted by a high pass filter in the oscillating operation.

In contrast, in a case in which the steady-state deviation is not deducted by the high pass filter 31, the learning control unit 27 learns even the steady-state deviation. Therefore, as shown in FIG. 3, the actual position (the graph of the bold line) deviates significantly from the moving command (the graph of the thin line) in the X-axis direction which is the horizontal axis. Therefore, for example, in a case in which the cross-sectional shape of the workpiece W is a tapered shape or an arc shape, an unnecessary cut for the workpiece W is generated. FIG. 3 is a graph showing the operation of the tool 11 in a case in which the steady-state deviation is not deducted by the nigh pass filter 31 in the oscillating operation.

The present embodiment described above exerts the following effects. Provided in the present embodiment are the high pass filter 31 and the adder 241 as the deviation deducting unit that applies the oscillation command to the position deviation based on the moving command for causing the workpiece W and the tool 11 to relatively move, and deducts the steady-state position deviation, and the learning control unit 27 as a learning control unit that calculates the compensation amount from the position deviation based on the moving command after deducting the steady-state position deviation. With such a configuration, it is possible to suppress the actual position from significantly protruding with respect to the moving command by the learning control unit 27 learning even the steady-state deviation. Therefore, in particular, it is possible to prevent an unnecessary cut from being generated in the oscillation machining and, for example, in a case in which the cross-sectional shape of the workpiece W is a tapered shape or an arc shape, it is possible to prevent an unnecessary cut from being generated in the oscillation machining.

Although an embodiment of the present invention has been described above, the present invention is not limited to the embodiments described above, and various modifications and variations are possible. For example, in the embodiment described above, a configuration is exemplified in which the tool 11 oscillates along the generating line of the outer peripheral surface of the workpiece W as the workpiece W rotates; however, the present invention is not limited to this configuration. It may be configured such that the machine tool according to the present invention machines the workpiece W by controlling the spindle M0 that causes the workpiece W and the tool 11 to relatively rotate about the center axis line of the workpiece W, and at least two feed axes M1 and M2, etc. that relatively feed the workpiece W and the tool 11 in the machining direction along the center axis line. For example, a configuration may be assumed in which the tool 11 rotates about the center axis line of the workpiece W and the workpiece W oscillates with respect to the tool 11, or the workpiece W rotates, and the workpiece W oscillates in the direction along the generating line of the outer peripheral surface of the workpiece W with respect to the tool 11. The present invention also includes, as a kind of the machining, a machining method of cutting the workpiece W by causing the tool 11 to rotate about the center axis line.

1 machining system
10 machine tool
11 tool
23 oscillation command generating unit
27 learning control unit (learning control unit)
31 high pass filter (deviation deducting unit)
241 adder (adder, deviation deducting unit)
242 adder (adder)
251 subtractor (subtractor)
M0 spindle
M1, M2 feed axis
W workpiece

What is claimed is:

1. A servo controller which controls a machine tool that turns a workpiece by cooperative operation of a plurality of axes, the servo controller comprising:
    an oscillation command generating unit that generates an oscillation command for causing the workpiece and the tool to relatively oscillate;
    a deviation deducting unit that applies the oscillation command to a position deviation based on a moving command for causing the workpiece and the tool to relatively move, and deducts a steady-state position deviation; and
    a learning control unit that calculates a compensation amount from a position deviation based on the moving command after deducting the steady-state position deviation.

2. The servo controller according to claim 1, wherein the deviation deducting unit comprises a high pass filter.

* * * * *